July 14, 1936.  H. E. JONES  2,047,325
REAR VIEW MIRROR FOR TRUCKS
Filed July 27, 1935   2 Sheets-Sheet 1
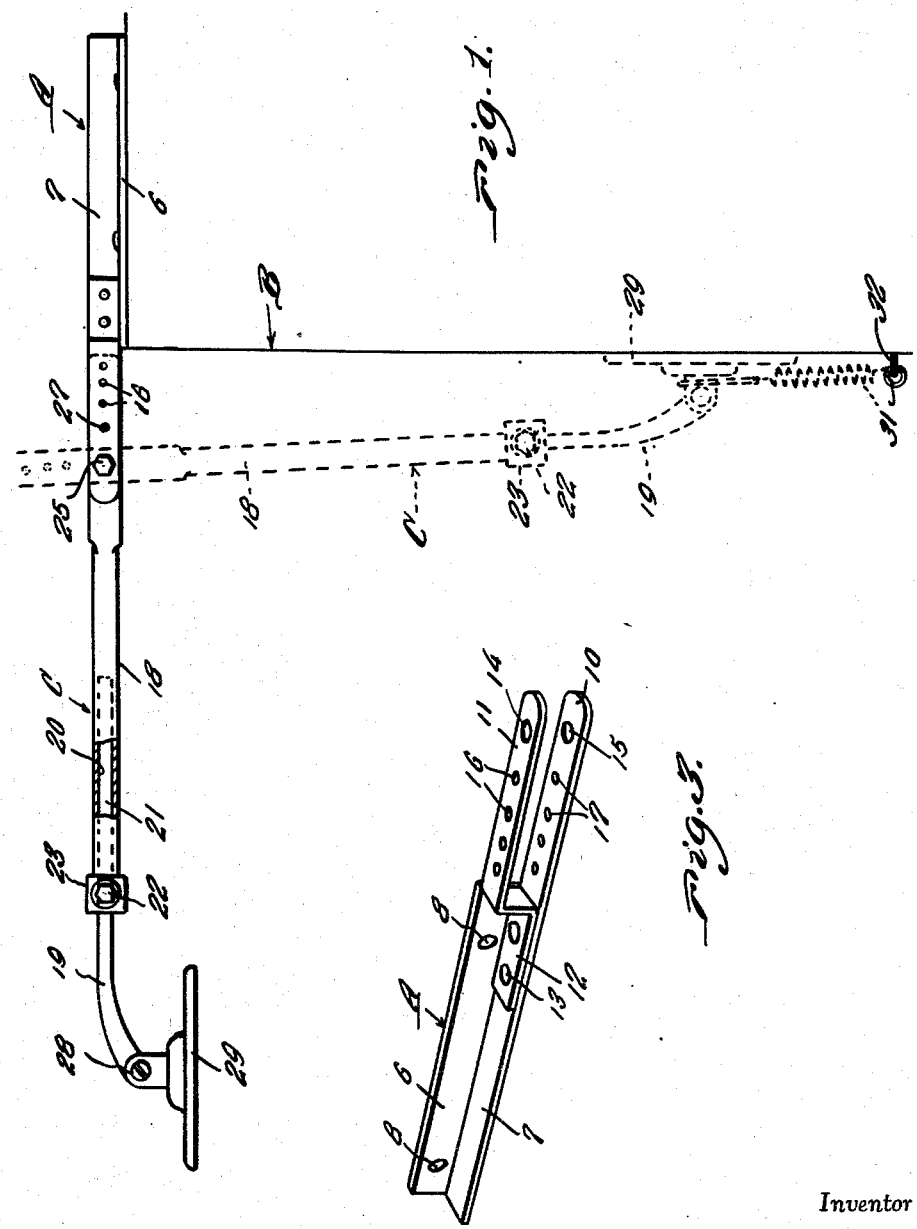
Inventor
*Herbert L. Jones*
By *Clarence A. O'Brien*
Attorney July 14, 1936.     H. E. JONES     2,047,325
REAR VIEW MIRROR FOR TRUCKS
Filed July 27, 1935     2 Sheets-Sheet 2
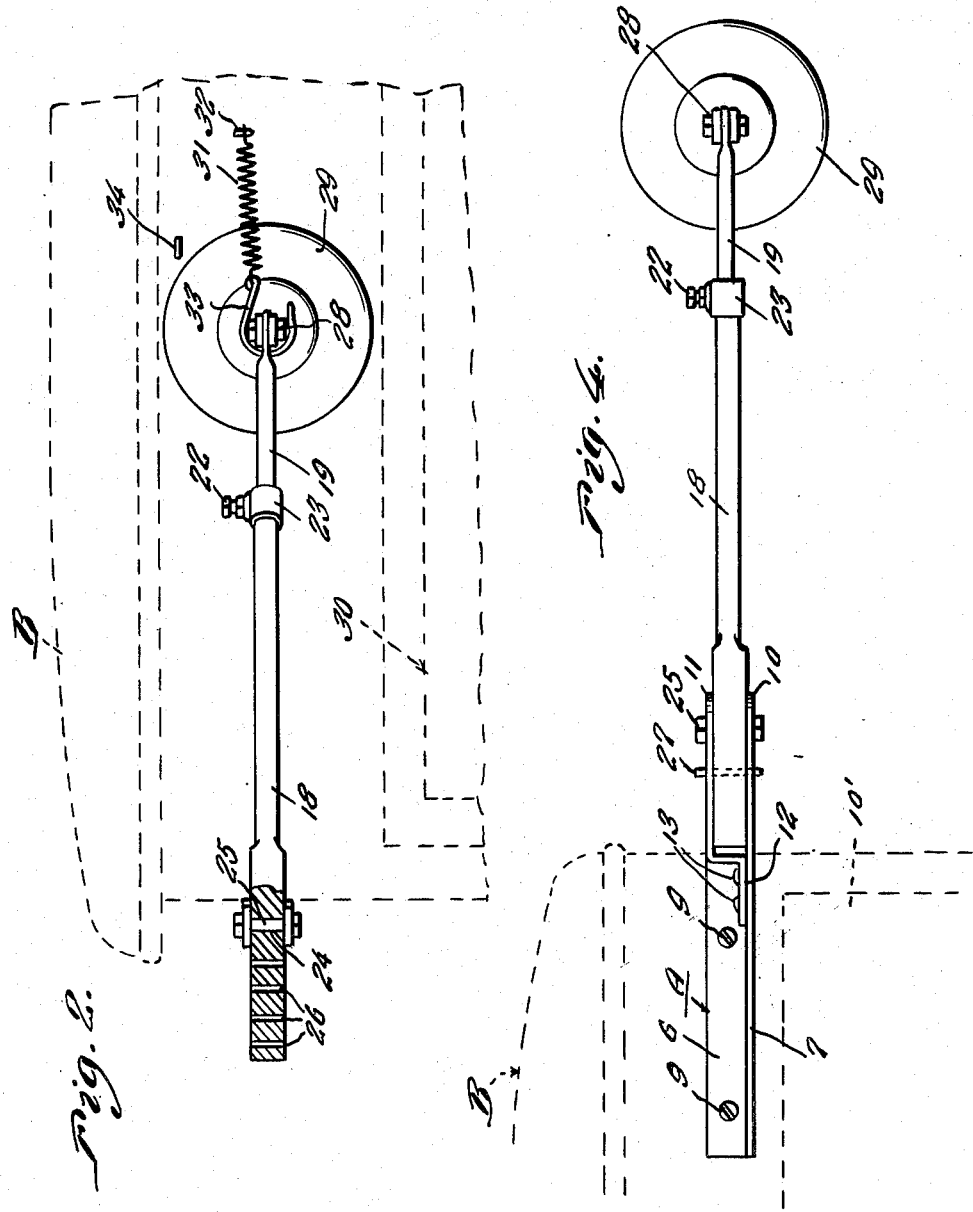
Inventor
Herbert E. Jones
By Clarence A. O'Brien
Attorney Patented July 14, 1936

2,047,325

UNITED STATES PATENT OFFICE 2,047,325

REAR VIEW MIRROR FOR TRUCKS

Herbert E. Jones, Lake Wilson, Minn.

Application July 27, 1935, Serial No. 33,575

1 Claim. (Cl. 248—285)

This invention relates to rear view mirrors particularly constructed for automobile trucks.

Due to the peculiar conditions in truck constructions, rear view mirrors designed to operate efficiently therewith must of necessity have relatively long arms so as to project laterally from the cab to permit the operator to obtain rear vision. At the same time the mirror must be positioned within easy reach of the driver of the truck so that it may be manipulated and adjusted. In the design of rear view mirrors for trucks it must also be borne in mind that there is considerable more vibrating and jolting when attached to an automobile truck than is experienced in a passenger automobile.

It is one of the prime objects of the present invention to construct a rear view mirror for application to the cab of a truck, which may be swung to inoperative position out of the way of the driver when he enters or leaves the cab and to further provide for a very rigid connection in the extended position which connection is rupturable in event the mirror is struck by objects projecting into the roadway such as limbs of trees or the like and which connection is easily fractured without doing any injury to the parts of the support.

Further objects of the invention are to provide a rear view mirror of the character referred to that is strong, compact and durable, thoroughly reliable for its intended purpose, having very few parts that need repair, and comparatively inexpensive to manufacture and install in the cab of an automobile truck.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, variations and modifications may be resorted to without departing from the spirit of the claim hereunto appended.

In the drawings wherein like reference characters denote corresponding parts throughout the several views:

Figure 1 is a top plan view of the left hand forward corner of a cab of an automobile truck illustrating an adaptation therewith of the rear view mirror structure in accordance with the present invention.

Figure 2 is a fragmentary side elevation of the forward left hand corner of the cab of an automobile truck showing the rear view mirror in inoperative position.

Figure 3 is a perspective view of the supporting bracket.

Figure 4 is a front elevation of the left hand forward corner of the cab of an automobile truck showing the rear view mirror in extended operating position.

Referring to the drawings wherein is disclosed the preferred embodiment of the invention, A indicates generally the supporting bracket formed of an angle iron of suitable length. This bracket A is formed with a vertical flange 6 and a horizontal flange 7. The vertical flange 6 is shorter in length than the vertical flange 7 and the horizontal flange has openings 8 at each end by which the bracket A is secured to the front of the cab B by means of the bolts 9 extending through the openings 8. The bracket A is positioned horizontally across the front of the cab B above the windshield 10'. The end of the vertical leg 6 terminates flush with the corner of the cab B.

Since the horizontal flange 7 is of greater length than the vertical flange 6, the extending portion 10 projects laterally of the cab and this forms one of the tongues or ears to which the swinging mirror arm to be presently described is pivoted. The other tongue or ear 11 consists of a flat metal bar formed with a right angled integral extension 12 on its inner end which is riveted or bolted as at 13 to an intermediate portion of the horizontal flange 7. The right angled extension 12 forms the construction which spaces the projecting tongue or ear 11 with respect to the tongue 10. At the outer ends the spaced tongues or ears 10 and 11 are formed with registering pivot openings 14, 15 and spaced inwardly from the pivot openings the tongues are respectively formed with spaced registering openings 16, 17.

The swinging mirror supporting arm is indicated at C and is formed of an inner section 18 and an outer section 19. In the outer end of section 18 it is formed with a socket 20 in which slides the inner end 21 of the section 19. The outer section 19 may be secured in any desired adjusted position by means of the set screw 22 carried by a collar 23 on the end of section 18.

At a certain distance from the inner end section 18 is provided with a pivot opening 24 which registers with the openings 14 and 15 in the respective tongues 11, 10 and the arm C swings on the bolt 25 extending through the openings. Inwardly from the pivot opening 24 the end of section 18 is provided with a series of spaced openings 26, which when the arm C is in the extended relation register with the respective series of eye openings 16, 17 on the tongues 11, 10. When the arm C is in extended position a rupturable or fracturable pin, preferably formed of wood such as a match stick 27 may be inserted in any one of the spaced registering openings as is clearly shown in Figure 4 of the drawings. It will be seen that if the match stick 27 is inserted through one of the series of registering openings farthest away from the pivot bolt 25 that it will be fractured the easiest should the arm C strike the bow of a tree extending into the roadway, and likewise it will offer the greatest resistance to fracture when inserted through the registering openings next to the pivot bolt 24. The position of the match stick 27 may therefore be selectively positioned as the exigencies of the road with respect to potential obstacles demand. To the outer end of the swinging arm section 19 is pivoted as at 28 the rear view mirror 29. It will be seen that the swinging mirror arm C in the extended position assumes a horizontal position projecting laterally of the automobile truck cab B and the outer section 19 thereof may be adjusted outwardly by the driver of the automobile within the limits provided for by moving the inner end 21 in or out of the socket 20 in section 18. When not in use, the swinging arm may be moved rearwardly after extracting the match stick 27 to the position shown in Figures 1 and 2. In the folded position, the swinging arm C is held against the side of the cab above the cab door 30. To maintain the swinging arm in the folded position, a coil spring 31 is secured to an eye 32 on the side of the cab and on the outer end of the coil spring is a hook 33 which engages over the rear of the rear view mirror 29. When the swinging arm C is extended, the hook 33 may be inserted in a second eye 34 on the side of the cab to prevent the spring from dangling loosely over the door 30.

By constructing the rear view mirror support as heretofore described it will be seen that the arm C when in the extended position is held securely in position first by the pivot bolt 24 and by the second connection which is the match stem 27 thereby obviating the necessity of spring joints or folding joints that often rattle and cause considerable noise. Furthermore, by having the inner end of section 18 between the tongues 10, 11, these tongues embrace the inner end of the arm and provide additional vertical support.

Having described my invention, what I claim as new is:

A rear vision mirror supporting structure comprising a support bracket adapted to be attached to the cab of an automobile truck, said bracket including an angle shaped member having one end shorter than the other to provide one tongue, and a bar having an inset portion attached to the flange of which the said one tongue is a continuation to provide the second tongue spaced from the first mentioned tongue, an extensible arm pivoted adjacent one end between the ends of the spaced tongues, said extensible arm and said tongues formed with spaced apertures, a wooden pin selectively insertable in any one of the registrable openings in the tongues and arm whereby the arm may swing on its pivot when the wooden pin is ruptured when the arm is struck by an object, and a rear view mirror swingably connected to the end of the extensible arm.

HERBERT E. JONES.